United States Patent [19]

Ruprecht et al.

[11] Patent Number: 4,510,521
[45] Date of Patent: Apr. 9, 1985

[54] CIRCUIT FOR ADJUSTING THE AMPLITUDE OF A COLOR SIGNAL

[75] Inventors: Jürgen Ruprecht, Norderstedt; Wolfgang Weltersbach, Hamburg, both of Fed. Rep. of Germany

[73] Assignee: U.S. Philips Corporation, New York, N.Y.

[21] Appl. No.: 416,726

[22] Filed: Sep. 10, 1982

[30] Foreign Application Priority Data

Sep. 12, 1981 [DE] Fed. Rep. of Germany ....... 3136216

[51] Int. Cl.³ ............................................. H04N 9/44
[52] U.S. Cl. .................................................. 358/27
[58] Field of Search ...................... 375/98; 358/27, 35, 358/169, 174, 184; 364/754–757

[56] References Cited

U.S. PATENT DOCUMENTS

3,849,593 11/1974 Brun ....................................... 358/27
4,219,839 8/1980 Watanabe .............................. 358/27

Primary Examiner—Tommy P. Chin
Attorney, Agent, or Firm—Thomas A. Briody; William J. Streeter; Edward W. Goodman

[57] ABSTRACT

By means of a digital filter, the chrominance signal is separated from the digitized picture signal and is applied to a variable-gain amplifier which is formed by the series arrangement of a shift stage and a multiplier. The two stages are controlled by a control circuit which receives the maximum amplitude value of the color synchronizing signal, obtained in a digital manner. Depending on this amplitude value the position of the chrominance signal is shifted and thereafter multiplied in the multiplier by a factor of, for example, between 0.5 and 1. Acting thus, the gain factor is split into two sub-factors, one of which is an integral power of 2 and in this way the multiplier is utilized in a much more advantageous manner. The amplitude value of the color synchronizing signal is measured before the amplifier, so that the control is a forward control, none of the problems occurring with closed control loops now being present.

19 Claims, 10 Drawing Figures

CIRCUIT FOR ADJUSTING THE AMPLITUDE OF A COLOR SIGNAL

BACKGROUND OF THE INVENTION

The invention relates to a circuit for adjusting a fixed amplitude ratio between a chrominance signal separated from a composite color television signal and a luminance signal by means of a variable-gain amplifier, the gain of which is controlled in dependence on the amplitude of a color synchronizing signal.

In a television receiver, the composite color television signal (CVBS), demodulated from the intermediate frequency, is split into the brightness signal and the chrominance signal which are further processed separately. The chrominance signal amplifier must be controlled automatically so as to cause the color information on the picture tube to be always in the correct ratio to the luminance signal and to make it independent of the tuning of the receiver or of the tolerances in the receiving circuit. As the chrominance signal-to-luminance signal ratio depends on the picture content, the setting of the chrominance signal amplifier is controlled in dependence on the amplifier of the color synchronizing signal (burst), as it is always in a defined ratio to the luminance signal. The required control range of the chrominance signal amplifier is determined by the tolerances of the total transmission path from picture recording to the color television receiver, the amplitude being very strongly affected by a slight detuning of the receiver, which is more specifically caused by the fact that the chrominance signal which is transmitted at the carrier frequency is, in the customary receiver designs, located at the band limit of the intermediate frequency filter. Allowing for a certain amount of overdrive, this results in a total required setting range of approximately 24 dB.

In the television receivers which have been customary so far, as described in, for example, the periodical "VALVO Mitteilungen" 63, April, the control of the chrominance signal amplifier is effected by deriving a voltage for controlling the amplifier from the amplitude of the color synchronizing signal at the output of the amplifier. This results in a closed control loop which keeps the value of the color synchronizing signal at the output of the amplifier as constant as possible. However, it is very difficult to optimize such a control and it has all the well-known problems of closed control loops.

The periodical "Elektronik", 1981, Volume 16, pages 27 to 35, inclusive, describes a television receiver design which operates digitally to a considerable extent. However, this periodical contains very little information about the setting of the chrominance signal amplifier, from which it has been found that also in this design a closed control loop is used for setting the chrominance signal amplifier.

SUMMARY OF THE INVENTION

The invention has for its object to provide a circuit of the type described in the opening paragraph, in which an accurate control of a fixed ratio between the chrominance signal and the luminance signal is obtained with little cost and design effort. According to the invention, this object is accomplished in that the sampled and binary digitized chrominance signal passes, in the variable-gain amplifier, through a shift stage, in which each sample is shiftable over a controllable, integral number of bit positions, and through a multiplier, that an amplitude detector determines the amplitude of the color synchronizing signal (burst) present before the variable-gain amplifier as a digital amplitude value, and that a control circuit forms from the quotient of a predetermined value, and said amplitude value a shifted control signal for the shift stage which determines the number of bit positions through which each sample is shifted, and also generates the multiplying factor for the multiplier by which the samples, shifted over a number of bit positions, are multiplied. So, according to the invention, instead of the prior art control loop, a forward control is used which is rendered possible in that the digital amplification is effected perfectly accurately and without tolerances. Dividing, in accordance with the invention, the digital amplification into a multiplication by integral powers of two, as this is the effect caused by the positional shift in the shift stage, and a subsequent multiplication of the samples which were shifted over a number of bit positions, realizes a very good use of the multiplier, since this multiplier only processes significant bits and may, consequently, be designed for a minimal number of bits.

Since the shift stage carries out a multiplication by integral powers of 2, it is advantageous for the ratio between the maximum and minimum multiplying factors $k_1$ supplied by the control circuit at different magnitudes of the digital amplitude value, to be not more than equal to 2, preference being given to $0.5 \leq k_1 < 1$.

The amplitude detector may be designed in several ways. An advantageous embodiment of the amplitude detector comprises an absolute value-generating means, a digital comparator and a storage register for a digital sample of the chrominance signal, an input of the comparator and the input of the storage register being connected to the output of the absolute value-generating means, the other input of the comparator being connected to the output of the storage register which supplies the amplitude value, the comparator supplying an output signal if the output signal of the absolute value-generating means exceeds the output signal of the storage register, and a control stage erasing the content of the storage register at least prior to each new color synchronizing signal and enabling the storage of a new sample in the storage register only for the duration of the color synchronizing signal at an output of the comparator. This results in a construction which can be implemented with little cost for high rates, as the sequence of the samples occurs at a rate which, in order to satisfy the sampling theorem, is located sufficiently high above twice the frequency of the color synchronizing signal of approximately 4.4 MHz, more specifically four times said rate. The absolute value-generating means can easily be realized in the form of exclusive-OR-circuits, when the samples are represented at negative values in two's complement notation.

A further embodiment of the amplitude detector is characterized in that the amplitude detector comprises an absolute value-generating means, a comparator and an up/down counter, that the comparator compares the output signal of the counter with all the samples applied during a color synchronizing signal period and applies a counting clock pulse to the counter, the result of the comparison controlling the direction of count, when the highest sample value of the samples applied in a color synchronizing signal period is not accurately equal to the output signal value of the counter, and that only the highest positions of the counter supply the amplitude value. So a change of the value of the samples of the color synchronizing signal always produces only one step of the counter in the direction of the change, so that both because of this fact and particularly in that the highest positions of the counter are evaluated, an effective low-pass filtration is produced. Also here only the highest sample values in each color synchronizing signal period have any effect, so that the amplitude detectors described for the above two embodiments are peak-value detectors.

A further embodiment of the amplitude detector, in which the average value of the amplitude values is obtained from each color synchronizing signal, is characterized in that the amplitude detector comprises an absolute value-generating means, a calculating circuit and a storage register, that the calculating circuit adds consecutive samples for the duration of the color synchronizing signal to the content of the storage register which has been previously reset to zero, and that at the end of the color synchronizing signal, the content of the highest positions of the storage register represents the amplitude value.

In these embodiments of the amplitude detector, it is assumed that the samples are obtained at defined phase angles from the color synchronizing signal, that is to say that the phase of the clock signal for obtaining the samples is coupled to the phase of the color synchronizing signal.

A further embodiment of the amplitude detector in which no phase coupling is required, is characterized in accordance with a further embodiment of the invention in that the digitized samples are passed through a digital squaring circuit, that an accumulator, which is connected to the output of the squaring circuit via a digital low-pass filter having a cut-off frequency of less than twice the frequency of the color synchronizing signal, adds together a predetermined number of squared, filtered samples and that a fraction of the values added together in the accumulator, which fraction belongs to the predetermined number of squared, filtered samples, is applied to the control circuit. It can be easily demonstrated that when a signal is squared, a direct voltage having a superposed alternating voltage of twice the frequency of the signal to be squared, is obtained, it being easy for the low-pass filter to remove the last mentioned portion. During the addition, only a fraction of the sum being further processed, an average value is produced, so that the ultimately obtained digital amplitude value is independent of the position of the sampling moments relative to the color synchronizing signal.

However, a digital squaring circuit means extra circuit elements. The provision of these extra circuit elements can, however, be avoided in that, in accordance with a further embodiment of the invention, the squaring circuit is the multiplier and that three change-over switches are provided which are operated during the color synchronizing signal and the first switch switches the multiplying input of the multiplier from the output of the control circuit to the multiplication factor input, the second switch switches the output of the multiplier from the output of the variable-gain amplifier to the input of the low-pass filter, and the third switch switches the control input of the shift stage from the output of the control circuit to a fixed control signal. Namely, no chrominance signals to be amplified are present during the color synchronizing signals as the color synchronizing signals occur on the picture screen during the horizontal fly-back of the beam, so that at that instant the multiplier is not required, so that only the change-over switches are additionally required.

The above-described amplitude detectors may now also be used to provide inter alia a still more accurate control of the chrominance signal, more specifically at low levels, because the then ever increasing influence of noise and other interfering signals are taken account of. It is therefore advantageous for the output signal of the amplitude detector to switch in a picture information-free period, more specifically during at least a portion of the vertical blanking period, when the predetermined threshold value is exceeded, first the response curve of the chrominance signal filter arranged before the variable-gain amplifier to a smaller bandwidth and thereafter to switch off the chrominance signal. In this way the amplitude detector is employed, substantially without additional means, for several purposes, namely also for the determination of the noise amplitude which, when it has a sufficient value, that is to say at a weak input signal, is superposed on the color synchronizing signal and causes the amplitude thereof to seem larger than it actually is. Therefore, when a predetermined noise signal amplitude is exceeded, the gain of the chrominance signal is adjusted to zero, particularly because of the fact that in the color decoder, the color signal is fully switched off.

As the control circuit supplies the shift control signal and the multiplier the quotient of a predetermined value and the digital amplitude value, it is advantageous to provide in the control circuit a divider which divides the predetermined value by the amplitude value. Then, the multiplying factor is immediately obtained accurate to one positional shift, the positional shift occurring from the position of the most significant bits of the quotient and this positional shift indicating at the same time the control signal. Divider circuits for dividing two digital values are well known and need no further description here.

However, such divider circuits imply a certain number of switching elements. A simpler solution is characterized in that the divider is formed by a ROM-memory, the address signal of which is derived from the digital amplitude value and which, at each address, contains the control signal associated with this amplitude and also the associated multiplying factor. Such ROM-memories are simple and cheap elements. If in the commercially available ROM-memories the width of the word is not sufficient, it is advantageous to divide the ROM-memory into several submemories, some submemories containing the control signal and other submemories containing the multiplying factor, all submemories being addressed in parallel. Generally, dividing the ROM-memory into two sub-memories is sufficient. This solution is in general cheaper than the use of a special ROM-memory having a larger word width.

In the simplest case, it is assumed that the predetermined value is a fixed value. When ROM-memories are used, this results in a simple addressing mode. With an advantageous embodiment, the predetermined value is specially adjustable for setting the color saturation. Setting the color saturation then requires, in essence, no additional circuit elements. When ROM-memories are used in the control circuit of the above-described construction, it is advantageous when the adjustable value shifts the amplitude value by means of an arithmetical circuit and the shifted amplitude value represents the address of the respective ROM-memories. A particularly simple shift can be obtained by adding the predetermined value to the amplitude value. When a divider is used in the control circuit, an adjustable value can be processed directly.

Another solution for the control circuit which can also process an adjustable value without further measures, is to provide in the control circuit a microprocessor which forms the divider and, between two or more color synchronizing signals, produces the control signal and the multiplying factor. During one or several lines, respectively, at the beginning whereof the digital amplitude value is determined, this microprocessor then effects the division of the predetermined, optionally adjustable, value by value or values derived from a number of consecutive amplitude values, and produces the control signal and the multiplying factor for the subsequent line or lines, respectively. This shift over one or more lines is normally without significance, as in practice, in essence no change of the amplitude of the color synchronizing signal occurs over a small number of lines, as all the other parameters do not substantially change during the duration of some lines.

In the event that, at very weak signals, the color synchronizing signal varies considerably from one line to the other due to, for example, superposed noise, it is advantageous to provide a digital low-pass filter subsequent to the amplitude detector, if this has not already been provided functionally in the amplitude detector. Since the amplitude value at the output of the amplitude detector is a digital value, it is advantageous to form the low-pass filter as a digital first-order recursive filter having a storage register for a sample and an adder/subtractor, which adds the input sample to the content of the storage register and subtracts therefrom a predetermined fraction of the content of the storage register, which also represents the output value of the low-pass filter and that at the end of the color synchronizing signal, the result is stored in the storage register. Such a digital filter is of a simple construction and prevents, in a reliable manner, one single line being significantly affected compared with adjacent lines by, for example, noise or other interfering signals.

When a microprocessor is used as the control circuit, it is advantageous that the microprocessor receives the output signals of the amplitude detector and effects a low-pass filter action prior to the determination of the control signal and the multiplying factor with a number of preceding amplitude values. There are several possibilities for such a low-pass filtering by simulating prior art digital low-pass filters. It is particularly advantageous to have the microprocessor effect a recursive low-pass filtering of the amplitude values in accordance with the above-described low-pass filter. This only requires a simple calculation, which can be carried out without further measures by the microprocessor within the available duration of one or more lines.

Particularly when the microprocessor does not determine a new control signal for the shift stage and a new multiplying factor until after a number of lines, still further functions can be performed, preferably in time-division multiplex together with the functions described so far. It is particularly advantageous to have the microprocessor effect the determination of the amplitude value by temporarily storing at least a number of samples of the color synchronizing signal, reading them at a lower frequency and applying them to the microprocessor and processing them in accordance with one of the described amplitude detectors. So in that event, the amplitude detector, the low-pass filter and the control circuit can be realized in the form of only one microprocessor, so that a cheap embodiment is realized.

DESCRIPTION OF THE DRAWINGS

Embodiments of the invention will now be further described by way of example with reference to the accompanying drawings, in which.

DESCRIPTION OF THE PREFERRED EMBODIMENTS

Figure 1:
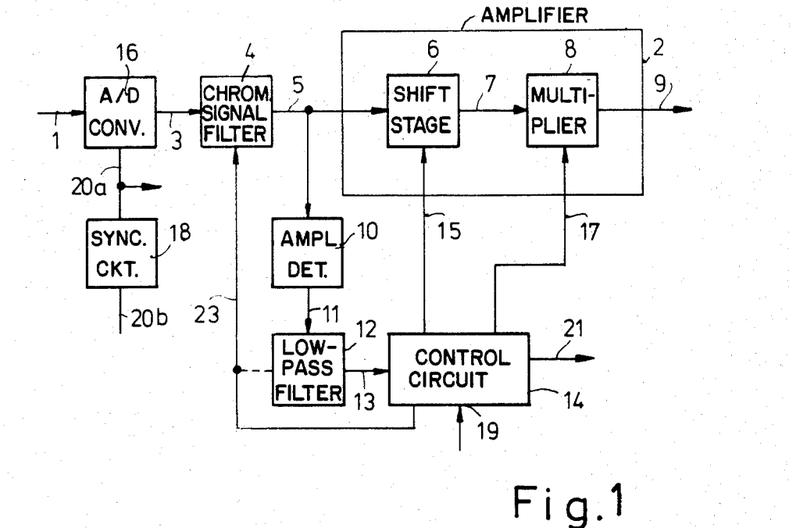
FIG. 1 shows a block circuit diagram of a circuit in accordance with the invention.

In FIG. 1 a composite color television signal obtained by demodulation from an intermediate frequency signal is applied via an input 1 to analog/digital converter 16, which is controlled by a synchronizing circuit 18 via a conductor 20a. For this purpose, a clock signal, whose phase is coupled to the phase of the color synchronizing signal, and further control signals are generated in the synchronizing circuit 18. These signals are shown in greater detail in FIG. 2. At (a) the variation of an analog signal which follows after a horizontal synchronizing pulse and is applied to the input 1 is shown. The end of the synchronizing signal is represented by the positive edge at the beginning of the diagram. A predetermined period of time after this positive edge, which is not represented to scale here, the sinusoidal color synchronizing signal having the chrominance subcarrier frequency, begins, of which only the beginning and the end are shown here. At this color synchronizing signal, a clock signal whose phase is locked to the phase of this color synchronizing signal is generated with exactly four times the chrominance subcarrier frequency, that is to say approximately 17.7 MHz, which is shown on line (b). Let it be assumed that the clock signal has already been synchronized by the previously occurring color synchronizing signals and that its frequency is very constant, so that it need only to be readjusted slightly at each new color synchronizing signal. The readjustment is effected so that one edge of the symmetrical clock signal coincides with the zero crossings or extreme value of the color synchronizing signal, respectively, so that the other clock signal edge is located at 45°, 135° etc. of the color synchronizing signal. In a analog/digital converter 16, this signal is sampled with the above-mentioned clock signal edge. The clock signal occurring in the conductor 20a is also applied to further portions of the circuit.

Figure 2:
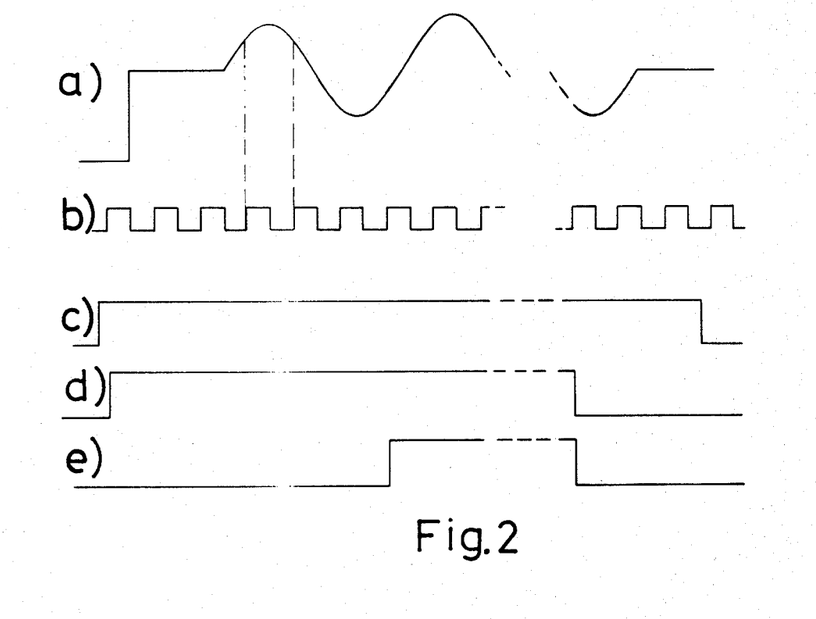
FIG. 2 shows a diagram describing the positions of the samples and of some control signals relative to the color synchronizing signal.

In addition, a color synchronizing signal blanking pulse BA, shown at (c) in FIG. 2, is generated in the synchronizing circuit 18. This BA-pulse starts prior to the occurrence of the color synchronizing signal and ends slightly thereafter. From this BA-pulse, an S1-pulse is generated which is in synchronism with the clock signal and ends prior to the end of the color synchronizing signal as shown at (d) in FIG. 2, for example by counting down a predetermined number of clock pulses. In addition, a S2-pulse is generated, which is shown at (e) in FIG. 2 and starts a predetermined number of clock pulses after the beginning of the S1-pulse and ends simultaneously therewith. Furthermore, short control pulses which are preferably shorter than one period of the clock signal and are denoted as S1'- and S2'-pulses are generated on the edges of the S1- and S2-pulses. In addition, a vertical blanking pulse VA and further control pulses are generated, as is customary in television receivers of an analog construction, so that these control pulses will not be further described here. These control pulses are fed out from the synchronizing circuit 18, each via a conductor, all these conductors here being shown as one single conductor 20b for the sake of simplicity.

An output 3 of the analog/digital converter 16 is not only connected to, for example, the luminance channel, not further shown here, but also to a chrominance signal filter 4, which only transmits the chrominance signal and conveys it via a conductor 5. The bandwidth of the chrominance signal filter 4 is switchable by means of control signals on a conductor 23. The conductors 3, 5 and further conductors in this figure and in subsequent figures each carry binary words consisting of several bits, so that they actually consist of a number of parallel, separate conductors which are here shown as one single connection for the sake of simplicity.

The conductor 5 is connected to an amplifier 2, the gain of which can be set via the conductors 15 and 17. The amplifier 2 must have a variable gain so as to ensure that the color information on the picture display tube is always in the proper ratio to the luminance signal. The chrominance signal, which is transmitted at the carrier frequency (4.4 MHz and side bands), is located, in contemporary receiver designs, at the band limit of the intermediate frequency filter. The position of the chrominance subcarrier on the edge of the intermediate frequency response curve results in that, depending on the tuning of the receiver, significant amplitude changes may occur in the chrominance signal. In addition, level differences, due to tolerances in the series production and owing to mismatch of the aerial, must be taken into consideration. The required control range is obtained from the tolerances of the total transmission path from the video source via the transmitter to the receiver:

| Chrominance subcarrier attenuation | $A_{nominal}$ | $A_{max.}$ |
|---|---|---|
| Modulator/Transmitter (IF) | −0,5 ... 1,0 dB | approx. 2 dB |
| Receiver (RF-IF-Selection) | 3 ... 6 dB | |
| Tuning/Fine Tuning −500 kHz < f < +300 kHz) | 0 ... 16 dB | 16 dB |
| | RF/IF in total | 18 dB |
| | overdrive allowance | 6 dB |
| | | 24 dB |

It is therefore necessary to provide a control range of at least 24 dB in order to ensure a constant color saturation 1. on the reception of different transmitters and
2. in the event of an incorrect tuning of the color television receiver.

By way of adjusting quantity for adjusting the gain, the amplitude of the color synchronizing signal (burst) is used, as this signal is in a fixed ratio to the color saturation. In FIG. 1 this amplitude of the color synchronizing signal is measured in an amplitude detector 10, a switching signal setting a fixed value in the range of possible values of the color synchronizing signal at the beginning of the occurrence of this signal and at the end of the occurrence of the color synchronizing signal the measured amplitude value is conveyed further via a conductor 11. This conductor is connected to a low-pass filter 12 which may in principle be omitted, but which prevents that a color synchronizing signal disturbed by interfering signals would represent an incorrect amplitude value and consequently might cause an impermissible change in the color saturation. The low-pass filter 12 may alternatively by included functionally in the amplitude detector 10, as will be described hereinafter.

The output signal of the low-pass filter 12 is applied via a conductor 13 to a control circuit 14 which produces, more specifically, the signals at the conductors 15 and 17 for controlling the gain of amplifier. The required total gain k of the amplifier 2 results from $$k = \frac{u_2 \text{ setting value}}{u_1 \text{ burst}}$$

$u_2$ setting value being the output signal of the amplifier 2 at the standardized amplitude of the color synchronizing signal and $u_1$ burst being the amplitude actually presented by the color synchronizing signal. This results in a simple forward control by means of the color synchronizing signal amplitude.

For the technical realization, it is advantageous to divide the gain factor k into a mantissa and an exponent based on powers of two $$k = k_1 \cdot 2^n,$$

The range of values for $k_1$ being limited to $0.5 \leq k_1 < 1$.

This principle of floating point notation enables the distribution into a shifting operation and a multiplication with fixed word width.

Figures 3A, 9:
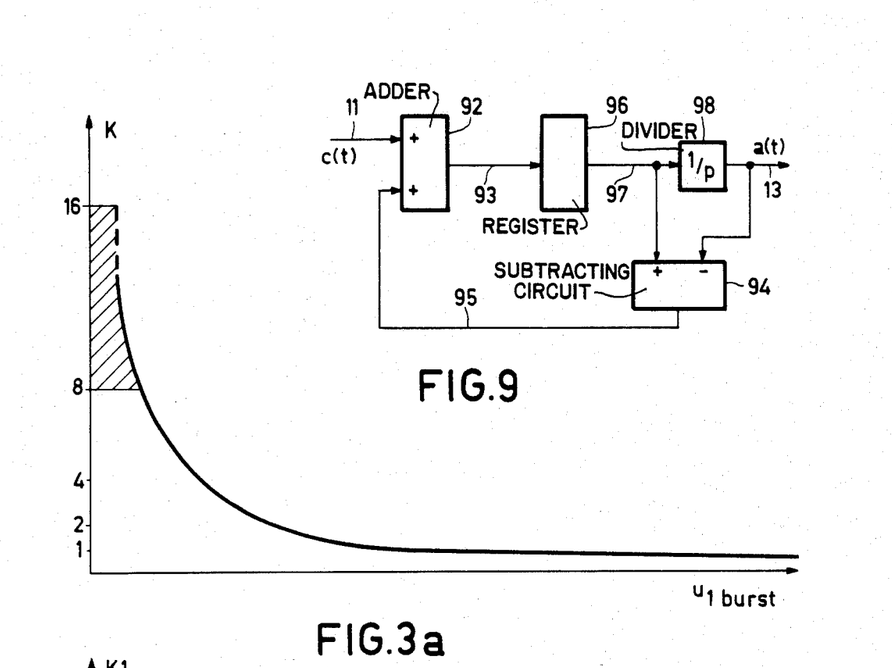
FIGS. 3a and 3b show diagrams describing the distribution of the multiplication into a bit shift and a multiplication which is limited to a number of bits.
FIG. 9 shows an embodiment of a low-pass filter arranged subsequent to the amplitude detector.
Figure 3B:
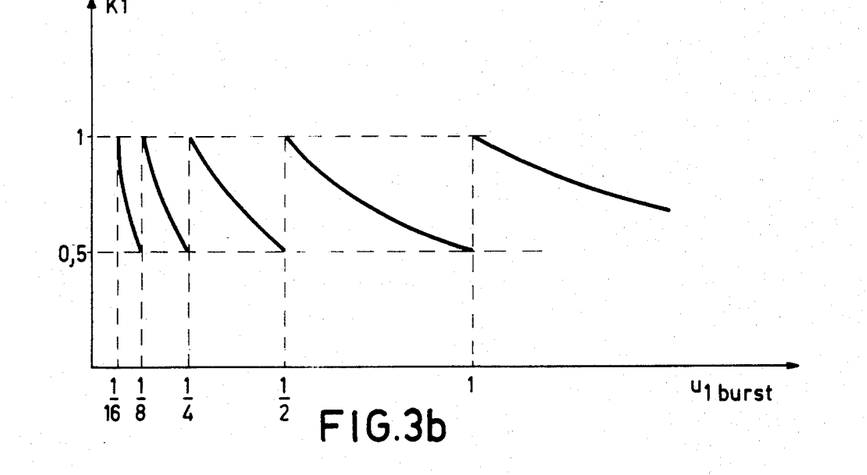

The advantages thereof will be further described with reference to FIG. 3. FIG. 3a shows the required amplification k in dependence on the input signal $u_1$. Considerable quantizing effects occur in the hatched region. In relation with, for example, a system having a word width of 8 bits, a multiplier required for the digital gain is only utilized for $\frac{5}{8}$ of its capacity already at a gain of k=4 and at a gain of k=16 it is only utilized for $\frac{3}{8}$ of its capacity. With the floating point notation shown in FIG. 3b the range of values for $k_1$ is located between 0.5 and 1, as mentioned above, that is to say the multiplier is optimally utilized for the full word width. As the chrominance signal filter 4 which precedes the amplifier 2, particularly at a narrow-band setting in response to a great noise amplitude detected in the amplitude detector, effects an increase of the word width to nearly 11 valid bits, and adequate resolution is ensured, even at a considerably reduced input signal, a shift stage 6 in the amplifier 2 being subjected to the maximum positional shift of 5 bit positions. In a fixed-point notation, a multiplication of 8×8 bits would not be sufficient, but a multiplication of 10×12 bits would be necessary to obtain an equally high resolution compared with the floating-point representation.

So the floating-point systems has the following advantage:

a wide control range with a good resolution can be achieved simple hardware implementation in (binary) digital systems, an optimum use of a predetermined multiplier with limited word width for the functions of $k_1 \times u_1$, an optionally selectable dynamic range, that is to say a gain by a factor of 32 at a shift up to n=5.

To enable the gain by multiplication in accordance with the floating-point notation, the amplifier 2 comprises the shift stage 6 and a multiplier 8, which are arranged successively, as indicated in FIG. 1. The control circuit 14 must then supply separate drive signals for both stages, that is to say over the multiple conductor 15, it must supply a control signal which indicates the number of positional shifts in the shift stage 6, and the multiplication factor for the multiplier 8 over a multiple conductor 17. If the control circuit 14 comprises a divider which, via a conductor 19, divides a predetermined, desired value $u_{2\ setting}$ by an amplitude value $u_{1\ burst}$ applied via a conductor 13, the quotient is only to be converted into a semi-logarithmic value with characteristic and residual number, the residual number denoting a multiplication factor and the characteristic denoting the number of positions to be shifted. Such a circuit is disclosed in, for example, German Offenlegungsschrift No. 23 12 128. The signal thus shifted over a number of positions and multiplied, is supplied from an output 9 of the amplifier 2 and applied to a color decoding circuit.

The amplitude detector 10 may alternatively be used to determine the noise or interfering signal portion, respectively, of the signal at the output 5 of the chrominance signal filter 4, by determining the amplitude of this signal in a picture-information free period, for example during the vertical blanking period of the picture signal, as the signal then present may be a noise or interfering signal. To prevent in this situation an excessive noise amplitude from being simulated by, for example, an individual interfering signal, several consecutive values are determined in the amplitude detector 10 and applied to the low-pass filter 12, at the output of which the average interfering signal amplitude, then appears. Depending on this interfering signal amplitude the chrominance signal filter may then be switched via a conductor 23 during the next picture period or field period, respectively, such that at least during the period of time the picture is visible, the bandwidth of the chrominance signal becomes narrower versus an increasing interference signal amplitude, resulting in an improved signal/noise spacing, as reducing the bandwidth of the chrominance signal disturbs to a lesser extent than the strong noise in the chrominance signal. The change-over of the chrominance signal filter 4 must of course be suppressed before the next determination of the control signal amplitude, that is to say the widest bandwidth must again be set, as at a narrower bandwidth too small an interfering signal amplitude would be measured so that prior to the next field period the chrominance signal filter 4 would again be switched incorrectly, which would cause a repeated switching from the reduced to the wider bandwidth.

The signal required for switching the chrominance signal filter 4 may be produced, for example, by comparing the interfering signal amplitude with several threshold values in the low-pass filter 12 and by applying the switching signal to the conductor 23 of the low-pass filter 12 via an output which is shown by means of a dashed line in the drawing. In the majority of cases, however, it will be simpler to carry out the determination of the value of the interfering signal amplitude in the control circuit 14 in the form of a dividing-circuit and to apply from there the signals for switching the chrominance signal filter 4 to the conductor 23, as shown in FIG. 1. In addition, a correction of the subsequently determined amplitude value by the interfering signal amplitude in the control circuit 14 prior to the determination of the control signal for the shift stage 6 and of the multiplying factor for the multiplier 8, is alternatively possible. In a limit case, in the event of an excessively large interfering signal amplitude, it is advantageous to switch off the chrominance signal completely, for example in the color decoder via the conductor 21, or to adjust the multiplying factor obtained on the conductor 17 to zero and thus render the gain of the chrominance signal equal to zero. In this way a highly interfering color noise in the displayed picture is prevented in a reliable manner from occurring.

Figure 4:
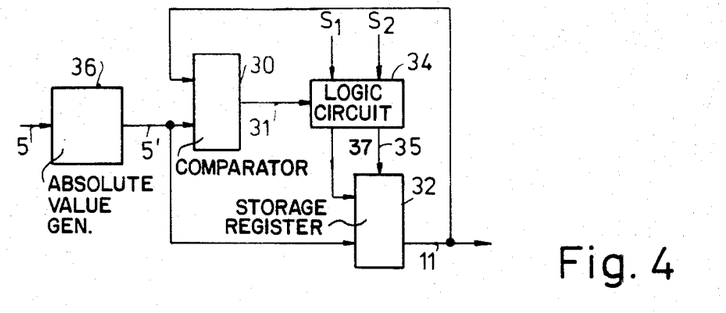
FIGS. 4–7, inclusive show some different embodiments of the amplitude detector.

A simple embodiment of an amplitude detector is shown in FIG. 4. Absolute values of the filtered samples of the chrominance signal are determined in an absolute value generator 36, which samples are applied via the conductor 5. This corresponds to a rectification in the analog mode. If the samples are coded in the two's complement code, the absolute value can be easily generated by an exclusive-OR-gate which is controlled by the sign bit. The absolute values are then applied via the conductor 5' to an input of a comparator 30 and to a data input of a storage register 32 for storing a sample. The output of the storage register 32 is the conductor 11 which at the end of the occurrence of the color synchronizing signal, supplies the amplitude value of this synchronizing signal and is connected to the other input of the comparator 30. If the value produced by the absolute value generator 36 exceeds the value supplied by the storage register to the conductor 11, then the comparator 30 supplies to a conductor 31 a signal which is applied to a logic circuit 34. This logic circuit 34 receives the two switching signals S1 and S2, mentioned in the foregoing, which are derived from the line synchronizing signals. Prior to the beginning of the color synchronizing pulse, the storage register 32 is erased by these switching signals via a conductor 35, and on a conductor 37, for the duration of the color synchronizing signal at each output signal at a conductor 31 and at the output of the comparator 30, a pulse is generated which stores the absolute value, then present on the conductor 5', of the color synchronizing signal in the storage register 32. Acting thus, the storage register 32 contains, at the end of the color synchronizing signal, the sample of the greatest value obtained in the above procedure, which indicates the maximum amplitude of the color synchronizing signal.

Figure 5:
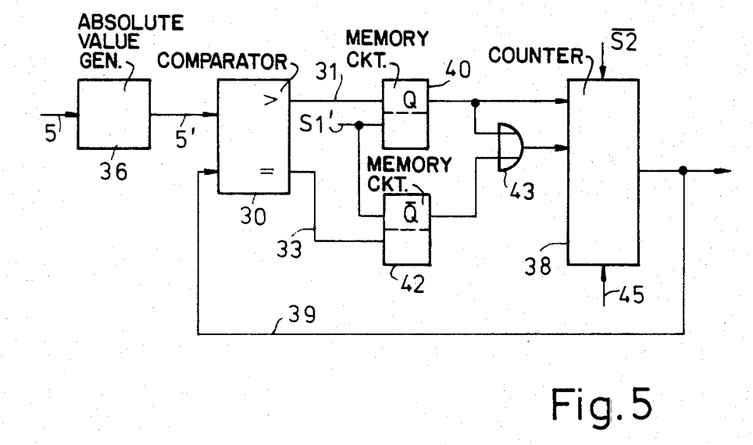

In the amplitude detector shown in FIG. 5, the output signals of the absolute value generator 36 are applied to one input of the comparator 30. The other input of the comparator 30 is connected to a conductor 39 at the output of a counter 38. The conductor 31 at the output of the comparator 30, which carries a signal if the absolute value present on the conductor 5' exceeds the output value of the counter 38, is connected to the setting input of a memory circuit 40. A further output 33 of the comparator 30, which carries a signal if the values applied to the comparator are equal, is connected to the setting input of a further memory circuit 42. The output Q of the memory circuit 40, which in the set state carries a signal, is connected to a control input for the direction of count of the counter 38 and to an input of a OR-gate 43, the other input of which is connected to the output $\overline{Q}$ of the further memory circuit 42, which output carries a signal in the reset state. The two memory circuits 40, 42 are reset at the beginning of the occurrence of the color synchronizing signal by the S1' pulse which is derived from the S1 pulse.

This circuit operates as follows. If, during the color synchronizing pulse, there is even only one sample higher than the position of the counter 38, then the memory circuit 40 is set so that the counter 38 is switched to the counting-up mode, and the counting operation is enabled via the OR-gate 43, so that the counter 38 adds up one step at the end of the color synchronizing signal in response to the inverted S2 pulse. It is then irrelevant whether at least one other sample was equal to the value counted by the counter 38 and the further memory circuit 42 was also set.

If at least one sample is equal to the value counted by the counter 38, but no sample higher than that value, only the further memory circuit 42 is set, so that none of the inputs of the OR-gate 43 receives a signal and the counter 38 is blocked. If in contrast therewith all samples are below the value counted by the counter 38, the two memory circuits 40 and 42 remain in the reset state. Because of this state of the memory circuit 40, the counter 38 is switched to the down-counting mode and because of the same state of the further memory circuit 42 the OR-gate 43 receives a signal from the output $\overline{Q}$, so that at the end of the occurrence of the color synchronizing signal, the counter 38 counts down one step. So with this circuit, only the direction of the deviation is evaluated and, independent of the magnitude thereof, is corrected by only one step. The circuit gets its actual low-pass behavior in that only the highest positions of the counter 38 are fed out via the conductor 39. In order to have the circuit respond faster, more specifically on switch-on of the television set or on a switch to a different transmitter, the counter 38 is first set via a conductor 45 to a initial value which preferably corresponds to the standard amplitude of the color synchronizing signal. For both amplitude detectors 10 as shown in FIGS. 3 and 4, the highest sample is decisive, so that they are peak-value detectors.

Figure 6:
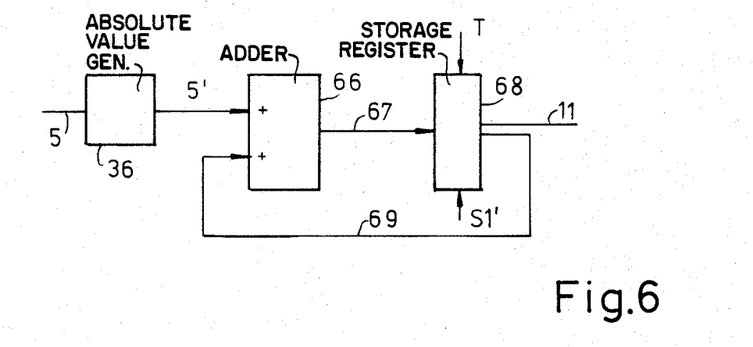

In the amplitude detector shown in FIG. 6 the output signal of the absolute value generator 36 is applied to one input of an adder 66. An output 67 of this adder 66 is connected to a storage register 68 of which an output 69, which includes all bits, is connected to the other input of the adder 66. During the S2-pulse, the storage register 68 receives, via a clock signal input T, a predetermined number of clock pulses from the synchronizing circuit 18 of FIG. 1, at each clock pulse, a value present on the input of the storage register 68 being stored in this storage register. The adder 66 and the storage register 68 which is of course erased, again by the S1' pulses, at the beginning of each color synchronizing signal, form together an accumulator which, during the occurrence of each color synchronizing signal, adds together a number of consecutive samples, which number is preferably equal to an integral power of 2. Via the conductor 11, then only the most significant bits are read from the storage register 68 and the least significant bits, whose number correspond to this power of 2, are omitted, so that the binary values on the conductor 11 indicate the mean value of the amplitude of the color synchronizing signal.

If the sampling rate of the analog/digital converter 16 of FIG. 1 is in such a phase relationship with the color synchronizing signal as is shown in FIGS. 2(a) and (b), so that the color synchronizing signal is then sampled 45° before and after a zero crossing, respectively, the amplitude detectors shown in FIGS. 4-6, inclusive, do not supply, at the end of the color synchronizing signal 14 the maximum value of the amplitude thereof, but a value which is less by the factor $\frac{1}{2}\sqrt{2}$, which, however, can be corrected in a simple way in the subsequent processing operation in the control circuit 14.

If such a phase coupling between the color synchronizing signal and the sampling rate is not or not yet present, sampling of the color synchronizing signal can be effected in certain circumstances in the maximum, so that then an excessively high value is measured. This can be prevented by means of a different implementation of the amplitude detector 10.

It can be demonstrated that squaring the color synchronizing signal samples eliminates a phase-dependency; for the quadrature modulated chrominance sub-carrier it holds that:

$$F(t) = (u \cdot \cos w_F t \pm v \cdot \sin w_F t)$$

For the color synchronizing signal $u = v = Uo$, it then holds:

$$F(t) = U_o(\cos w_F t \pm \sin w_F t)$$
$$F^2(t) = U_o^2(\cos w_F t \pm \sin w_F t)^2$$
$$= U_o^2(\cos^2 w_F t \pm 2\cos w_F t \cdot \sin w_F t + \sin^2 w_F t)$$
wherein $\cos^2 w_F t + \sin^2 w_F t = 1$
$$F^2(t) = U_o^2(1 \pm 2 \cdot \cos w_F t \cdot \sin w_F t)$$
wherein $2 \cdot \sin w \cos w = \sin w2$ $$F^2(t) = U_o^2(\underset{\text{DC-portion}}{\underline{1}} \pm \underset{\text{Harmonic 8,8 MHz}}{\underline{\sin 2w_F t}})$$

The result of $F^2(t)$ is a constant portion $U_o^2$ and a radio-frequency portion $\sin 2w_F t$. This radio-frequency portion can be suppressed by means of a simple filter, which is also in the form of a digital filter and has a cut-off frequency which is sufficiently below twice the color synchronizing signal frequency. For the squaring operation of the consecutive samples, a conventional multiplier may be used, which alternatively may be in the form of a Table of values in the form of a ROM-memory.

This, however involves a number of additional circuit elements.

Figure 7:
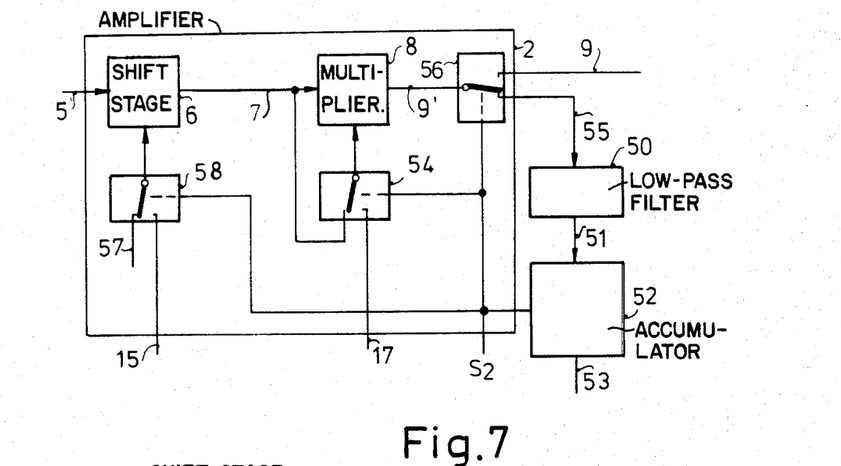

During the occurrence of the color synchronizing signal, the multiplier 8 of FIG. 1 is not necessary as then no useful color signal is present, so that this multiplier may then be used for the squaring operation. A circuit for the amplitude detector 10 operating in that way is shown in FIG. 7. In this circuit the control input of the shift stage 6 is preceded by a change-over switch 58 which switches this control input from the multiple conductor 15, which leads from the control circuit 14, to an external signal applied through a multiple conductor 57, so that during the squaring operation, at all times, the same defined shift is provided. In addition, the multiplying factor input of the multiplier 8 is preceded by a change-over switch 54 which switches the input from the multiple conductor 17 to the conductor 7, which is connected to the multiplying factor input of the amplifier 8. Finally, a conductor 9' at the outpt of the multiplier 8 is connected to a change-over switch 56, which switches this conductor 9' from the output 9 of the amplifier 2 to a conductor 55. These change-over switches 54, 56, 58 are switched to the position shown by the signal S2, mentioned already in the foregoing, which occurs only during the color synchronizing signal. As a result thereof a train of processed samples which corresponds to a direct voltage having superimposed thereon, an alternating voltage, is obtained on the conductor 55. This alternating voltage is filtered by a digital low-pass filter 50, so that on a conductor 51 only the samples corresponding to the direct voltage remain.

These samples are added together in an accumulator 52. At the end of the switching signal S2, a fraction of the sum thus formed is read via a conductor 53 a a mean value in accordance with the number of summed values. This output signal $\overline{U}_B^2$ then represents the square of the mean value in accordance with the following equation:

$$\overline{U}_B^2 = \frac{\sum_{n=1}^{N} U_n^2}{N},$$

$U_n$ being the consecutive samples. The fact that the square of the mean value is involved here, can be taken account of in the subsequent processing of this value in the control circuit 14. If the value N is an integral power of 2, the division by this value can be obtained by means of a simple positional shift of the accumulated value.

Such a value for N can be easily obtained in that the accumulation is only performed during a portion of the duration of the color synchronizing signal. If, however, the value N is not chosen to be an integral power of 2, a positional shift in accordance with the nearest integral power of 2 can be effected instead of the division by the value N, so that a square average value is obtained which is larger or smaller, respectively, by a constant factor. Also this constant factor can be easily corrected in the control circuit 14.

It is particularly simple to take account of the fact that the amplitude detector 10 produces the squared mean value, which is optionally multiplied by a constant factor, by implementing the control circuit 14 of FIG. 1 in the form of a microprocessor, which in many cases is already present in the control circuit 14 to perform other tasks and which can be operated in time-division multiplex for this purpose so that less additional circuit elements are required. To calculate the quotient from the predetermined, optimally adjustable, value and from the digital amplitude value, optionally after calculation of the square root thereof, and for, generating the control signal for the shift stage and the multiplier, the microprocessor may need a number of line periods of a television picture.

As a result thereof, the amplitude value measured at the beginning of a line does not have any effect until a later line. In practice this is of no consequence, if the amplitude detector is followed by a low-pass filter 12, as shown in FIG. 1. Also the generation of the described signals on the conductors 21 and 23 in FIG. 1 from an interfering signal amplitude, measured by the amplitude detector 10, can be easily realized by means of the microprocessor.

Figure 8:
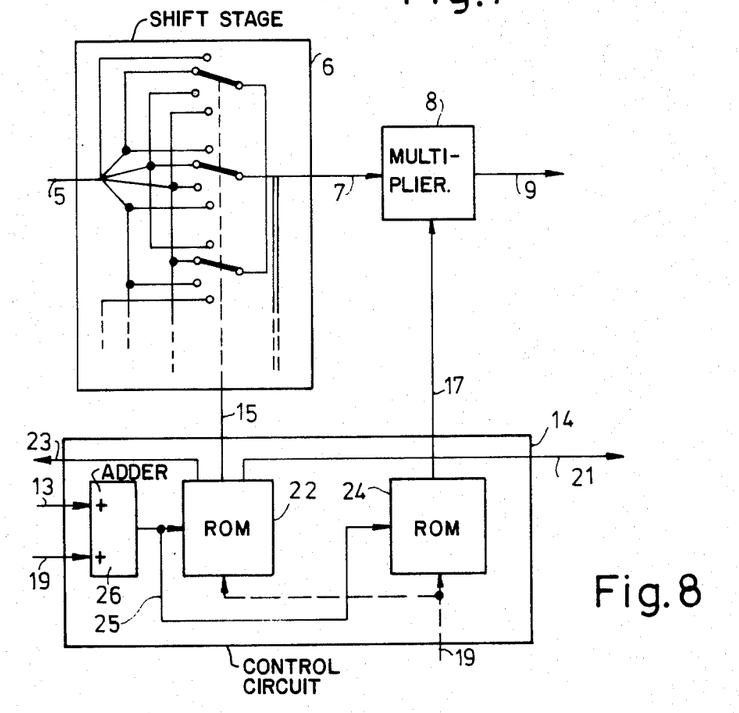
FIG. 8 shows an embodiment of the control circuit with ROM-memories.

FIG. 8 shows an embodiment of the control circuit 14. This embodiment comprises two ROM-memories 22 and 24 which are both addressed in parallel by an adder 26 via a conductor 25 and which consequently operate as a single ROM-memory with larger word widths. The adder 26 receives the amplitude value via the conductor 13 and the adjusting value via the conductor 19 and produces a sum from these two values. If the adjusting value is changed, this influences the sum, that is to say the address of the ROM-memories 22 and 24, as an apparent change in the amplitude value and consequently influences the variable-gain amplifier 2 as a change of the nominal gain relative to the luminance signal, that is to say the color saturation of the displayed color picture becomes greater or smaller. The value applied via the conductor 19 may alternatively changeover the addressing of the ROM-memories 22 and 24 via additional address inputs, as shown by means of dashed lines, so that the adder 26 may be omitted, which however requires a greater capacity of the ROM-memories 22 and 24. If the adjusting value is constant, for example because the setting of the color saturation must take place in the chrominance signal path, it will be obvious that the adder 26 may be omitted and the conductor 13 must be connected to the conductor 25.

The division to be affected in the control circuit 14 is consequently carried out by means of a table of values stored in the ROM-memories 22, 24. The ROM-memory 24 contains the multiplying factor associated with a given amplitude value, which factor is applied via the conductor 17 to the multiplying factor input of the amplifier 2. In each position, the ROM-memory 22 contains the associated control signal for controlling the positional shift. With a positional shift of, for example, not more than five positions, three bits are required for controlling the shift stage 6 via the conductor 15.

The shift stage 6 is preferably in the form of an electronic multiplexer comprising a multi-stage change-over switch for each bit of the binary word to be read on the conductor 7, as shown in FIG. 8. The change-over switches are all made operative in parallel by the control signal via the conductor 15. The binary word applied via the conductor 5 has in the relevant example approximately 11 bits, which are obtained by processing in the digital filter 4 an 8-bit binary word received from the analog/digital converter 16 when the filter 4 is set to a small bandwidth, while the binary words read via the conductor 17 has, for example, 6 bits. As a result thereof, there is in any case a sufficient number of significant bit positions available.

The binary words stored in the ROM-memory 22 have in general a width of 8 bits when commercially available integrated memory modules are used, so that some bit positions are free which are not required for controlling the shift stage 6. Some of these bit positions may contain the switching signals for changing-over the chrominance signal filter 4 in FIG. 1 and for switching off the chrominance signal, which switching signals are applied via the conductor 23 and 21, respectively, when the measured interfering signal amplitude is applied to the control circuit 14 via the conductor 13. These signals on the conductors 21 and 23 may, for example, be stored temporarily, which is not shown for the sake of simplicity, in order to use these signal during the subsequent processing of the amplitude of the color synchronizing signal. The threshold values of the interfering signal amplitude, the change-over of the chrominance signal filter 4 or the switch-off of the chrominance signal being carried out, are formed by the addresses of the ROM-memory 22, in which the switching signals are stored or changed, respectively. During the processing of the interfering signal amplitude, the value applied via the conductor 19 may be adjusted to, for example, zero or to an appropriate fixed value.

The change-over of the chrominance signal filter and the switchoff of the chrominance signal may alternatively be affected by the amplitude of the color synchronizing signal, instead of wholly or partly in dependence on the amplitude of the interfering signal in a picture information-free time interval. If, namely, the color synchronizing signal amplitude applied via the conductor 13 is so small that a considerable spuriousness, or interference of the chrominance signal by noise, must be taken account of, switching signals may be stored in free bit positions in the addresses of, for example, the ROM-memory 22, which addresses are associated with these color synchronizing signal amplitude values, so that at the additional conversion of the interfering signal amplitude, the associated switching signal can be read via the conductors 21 and 23.

The low-pass filter 12 shown in FIG. 1 may be in the form of a recursive low-pass filter of a construction as shown in FIG. 9. The non-filtered amplitude values C(t), which are consecutively supplied by the amplitude detector via the conductor 11, are applied to an input of an adder 92 whose output 93 is connected to a register 96 for a multi-position binary word. The output 97 of this register is connected to a divider circuit 98, the division here preferably being realized by a shift over a number of bits. When the register 97 takes over the value present on the conductor 93, each time after the time delay produced by the delay of the adder stage 62, at the end of the color synchronizing signal, the sequence of binary words occurring at the output 13 of the divider circuit 98 represents the filter amplitude value.

The output 97 of the register 96 and the output 13 of the divider circuit 98 are further connected to the two inputs of a subtracting circuit 94, the output 95 of which is connected to a further input of the adder 92. The output signal a(t) on the conductor 13 then depends in the following way on the applied, non-filtered amplitude value C(t):

$$a(t) = \frac{p-1}{p} a(t-1) + \frac{1}{p} C(t)$$

At a suitable choice of the divisor p in the divider circuit 98, it is therefore possible to ensure that a new applied amplitude value will only have very little influence in the output signal, so that individual interferences in a color synchronizing signal will exercise little influence. Anyway, one single amplitude value is generated at the output of the amplitude detector of FIG. 1 at each color synchronizing signal.

When a microprocessor is used in the control circuit 14 it may also effect the low-pass filtering action prior to the division, only two arithmetic operation steps and a positional shift stage by a shift being required. This results in a still further decrease of the number of switching elements.

Finally, when a microprocessor is used, also the determination of the amplitude of the color synchronizing signal and, optionally, of the interfering signal in a picture-information-free time interval may be affected with this microprocessor. However, with each amplitude determination, a number of directly consecutive samples must be processed, which occur at a frequency of approximately 17.7 MHz. As microprocessors for such high processing rates are very complex and costly, the fact that each time after a number of consecutive samples for the amplitude determination a comparatively much longer interval occurs, can be taken advantage of. The samples which are to be processed in correlation are first written into a buffer store, for which cheap, integrated semiconductor components having a sufficient speed are available, as in all cases only a limited number of, for example, 40–60 samples are involved, and thereafter the buffer store is read at the operating rate of the microprocessor and the content thereof is applied to the microprocessor. The samples may then be processed at a lower rate in the same way as in the amplitude detectors shown in the FIGS. 4–7 inclusive, at the rate of appearance of the samples. In addition to the controllable amplifier 2 of FIG. 1, only one buffer store and one single microprocessor connected to the chrominance signal filter 4 are then required, so that a very simple and cheap solution has been obtained.

What is claimed is:

1. A circuit for adjusting a fixed amplitude ratio between a chrominance signal, separated from a composite television signal, and a luminance signal by means of a variable-gain amplifier, the gain of which being controlled in dependence on the amplitude of a color synchronizing signal, characterized in that said circuit comprises, in addition to said variable-gain amplifier to which said chrominance signal, in the form of binary digitized samples, is applied and which comprises a shift stage for shifting a sample over a controllable integral number of bit positions, and an adjustable multiplier coupled to an output of said shift stage, an amplitude detector for measuring the amplitude of the color synchronizing signal contained in the chrominance signal applied to said variable-gain amplifier, and a control circuit, coupled to an output of said amplitude detector, having means for forming a shift control signal for said shift stage from the quotient of a predetermined value and a measured amplitude value for said color synchronizing signal, and means for generating a multiplying factor for said adjustable multiplier.

2. A circuit as claimed in claim 1, characterized in that the ratio between the maximum and minimum multiplying factors $k_1$, which are supplied by the control circuit at different magnitudes of the measured amplitude value is not more than 2, wherein $0.5 \leq k_1 < 1$.

3. A circuit as claimed in claim 1 or 2, characterized in that the amplitude detector comprises absolute value-generating means, a digital comparator, a storage register for a digital sample of the chrominance signal, and a control stage, wherein one input of the comparator and an input of the storage register are connected to an output of the absolute value-generating means, another input of the comparator is connected to an output of the storage register, which supplies the amplitude value, the comparator producing an output signal if the output signal of the absolute value-generating means exceeds the output signal of the storage register and the control stage erasing the content of the storage register at least prior to each new color synchronizing signal and only enabling, during the color synchronizing signal at an output signal of the comparator, the writing of a new, applied sample in the storage register.

4. A circuit as claimed in claim 1 or 2, characterized in that the amplitude detector comprises absolute value-generating means, a comparator and an up-down counter, wherein the comparator compares the output signal of the counter with the absolute value of all the samples of the chrominance signal applied to the comparator during a color synchronizing signal period and applies a control pulse to the counter, controlling the counting direction thereof when the highest sample value of the chrominance signal samples applied to said comparator in the color synchronizing signal period is equal to the output signal of the counter and wherein only the highest bit positions of the counter supply the amplitude value.

5. A circuit as claimed in claim 1 or 2, characterized in that the amplitude detector comprises absolute value-generating means, an arithmetical unit and a storage register, wherein during the color synchronizing signal period in said chrominance signal the arithmetical unit adds the absolute value of each sample of consecutive chrominance signal samples to the content of the storage register which was previously reset to zero and wherein at the end of the color synchronizing signal period, the content of the highest bit positions of the storage register represents the amplitude value.

6. A circuit as claimed in claim 1 or 2, characterized in that said circuit further comprises a digital squaring circuit to which said digitized chrominance signal samples are applied, and an accumulator which adds together, via a digital low-pass filter having a cut-off frequency less than twice the frequency of the color synchronizing signal, a predetermined number of squared, filtered samples, wherein a fraction of the value summed in the accumulator, which fraction corresponds to the predetermined number of squared, filtered samples, is applied to the control circuit.

7. A circuit as claimed in claim 6, characterized in that the squaring circuit is the multiplier and said amplifier further comprises a first, a second and a third change-over switches which are operated during the occurrence of the color synchronizing signal, wherein the first changeover switch switches the multiplying factor input of the multiplier from the output of the control circuit to the input of the multiplier, the second change-over switch switches the output of the multiplier from the output of the controllable amplifier to the input of the low-pass filter, and the third change-over switch switches the control input of the shift stage from the output of the control circuit to a fixed control signal.

8. A circuit as claimed in claim 1 or 2, characterized in that said amplitude detector comprise a microprocessor which performs the determination of the amplitude value, and means for storing at least a number of samples of the color synchronizing signal intermediately and for applying said samples at a lower frequency to the microprocessor for further processing.

9. A circuit as claimed in claim 1, characterized in that the control circuits comprises a divider, which divides the predetermined value by the amplitude value.

10. A circuit as claimed in claim 9, characterized in that the divider comprises a ROM-memory whose address signals are derived from the digital amplitude value and which, in each address, contains the control signal and the multiplying factor associated with the amplitude value.

11. A circuit as claimed in claim 10, characterized in that the ROM-memory comprises several sub-memories, a first quantity of said sub-memories containing the control signal and the remaining submemories containing the multiplying factor, all sub-memories being addressed in parallel.

12. A circuit as claimed in claim 1, characterized in that the predetermined value is specially adjustable for setting the color saturation.

13. A circuit as claimed in claim 10 or 11, wherein the predetermined value being adjustable for setting the color saturation, characterized in that the adjustable predetermined value shifts the digital amplitude value by means of a calculating circuit and the shifted amplitude value represents the address of one or all the ROM-memories respectively.

14. A circuit as claimed in claim 9, characterized in that the control circuit comprises a microprocessor which forms the divider and supplies, between different color synchronizing signals, the control signal and the multiplying factor.

15. A circuit as claimed in claim 1, charcterized in that the amplitude detector is followed by a digital low-pass filter.

16. A circuit as claimed in claim 15, characterized in that the low-pass filter comprises a first order digital recursive filter comprising a storage register and an adder/subtractor which adds the input signal to the difference of the content of the storage register and a predetermined fraction of the content of the storage register, which predetermined fraction of the storage register content also represents the output value of the low-pass filter, and writes the result of said addition in the storage register at the end of the color synchronizing signal.

17. A circuit as claimed in claim 14, characterized in that the microprocessor receives the output signals of the amplitude detector and performs, prior to the determination of the control signal and the multiplying factor, a low-pass filtering action, each time with a number of predetermined amplitude values.

18. A circuit as claimed in claim 16, characterized in that a microprocessor performs a recursive low-pass filtering action of the amplitude values in accordance with the low-pass filter.

19. A circuit as claimed in claim 3, characterized in that said circuit further comprises a bandwidth-adjustable chrominance signal filter for separating said chrominance signal from said composite television signal, and means for comparing the output signal of said amplitude detector with several threshold values and for generating signals, as a result of said comparisons, for controlling the bandwidth of said adjustable chrominance signal filter, whereby, during a picture-information-free time interval, more specifically duing at least a portion of a vertical blanking interval in said composite television signal, when excessive noise causes the output signal of said amplitude detector to exceed any of said threshold values, the bandwidth of said chrominance signal filter is progressively narrowed thereby reducing the effects of said noise.

* * * * *